United States Patent [19]

Martin et al.

[11] 4,090,534
[45] May 23, 1978

[54] LIVE GAS MAIN INSERTIONS

[76] Inventors: Luther W. Martin, 1221 Julie Dr., Champaign, Ill. 61820; Richard L. Smith, Box 682, St. Joseph, Ill. 61873

[21] Appl. No.: 662,948

[22] Filed: Mar. 1, 1976

[51] Int. Cl.² .......................... F16K 3/00; F16L 55/18
[52] U.S. Cl. ........................................ 138/97; 251/212; 277/129
[58] Field of Search .................... 138/97, 93; 251/212; 277/34.3, 128, 129

[56] References Cited

U.S. PATENT DOCUMENTS

| | | | |
|---|---|---|---|
| 2,113,529 | 4/1938 | Hild | 277/34.3 |
| 3,104,882 | 9/1963 | Street | 277/129 |
| 3,294,121 | 12/1966 | Powell et al. | 138/97 |
| 3,688,801 | 9/1972 | Rohrer | 138/97 |
| 3,845,789 | 11/1974 | Rohrer | 138/97 |

*Primary Examiner*—Steven L. Stephan
*Attorney, Agent, or Firm*—Jenkins, Coffey & Hyland

[57] ABSTRACT

A fitting for insertion of an elongated member, such as a semirigid rod, axially into the end of a live gas main section. The fitting comprises a housing defining a passageway opening which extends axially through the housing. The housing provides, at its opposite ends, exterior and interior openings. The housing is mounted on the main end with the interior opening sealingly engaging and in coaxial registry with the main end. The housing further provides a channel extending generally transaxially of the fitting between the exterior and interior openings. Two closure members are disposed in the channel and are selectively movable therein for increasing and decreasing the size of the passageway opening. The closure members include cooperating gate members and gaskets which define an aperture extending axially of the fitting. The gaskets provide a perimetral seal for the aperture. The aperture has a cross section substantially equal to the cross section of the elongated member. The cooperating gate members and gaskets seal the main end when the elongated member is inserted through the exterior and interior openings and into the main end and the closure members are closed about it. The fitting and semirigid rod are primary apparatus used in inserting a smaller diameter, high pressure plastic gas main into the live gas main. Grease chambers, wire feeds and nipples of various types are used in combination with the fitting to carry out the insertion of the smaller diameter main.

8 Claims, 12 Drawing Figures

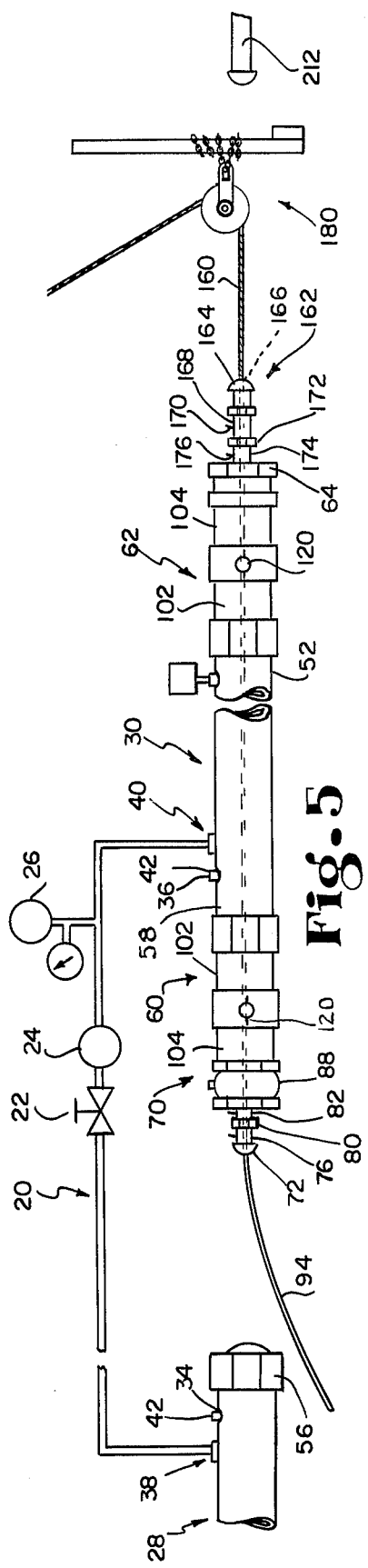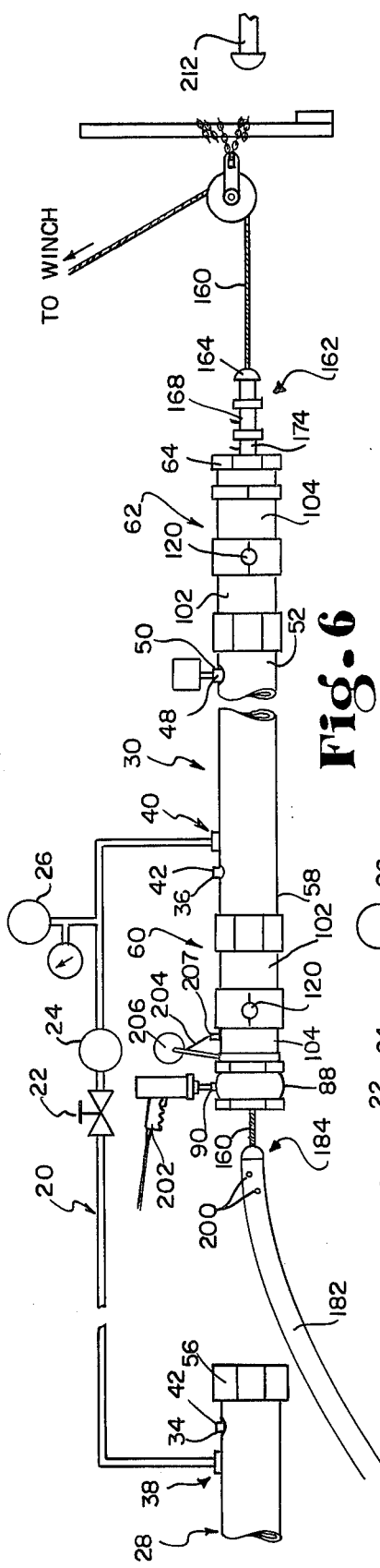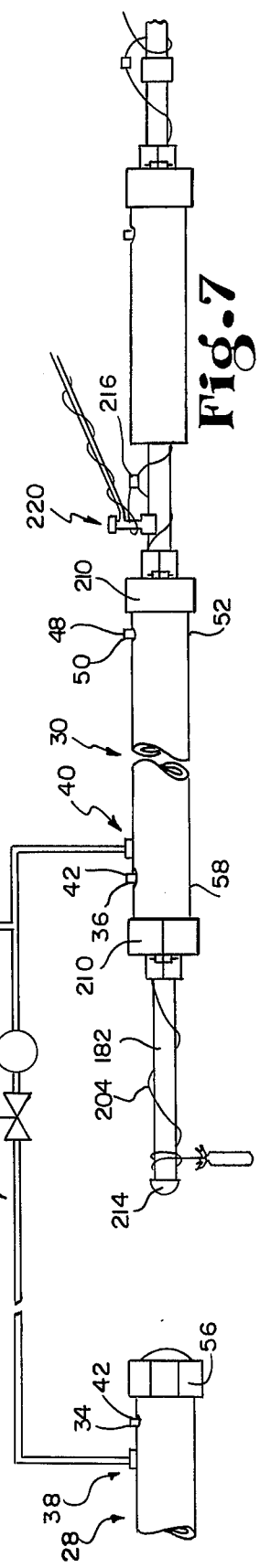

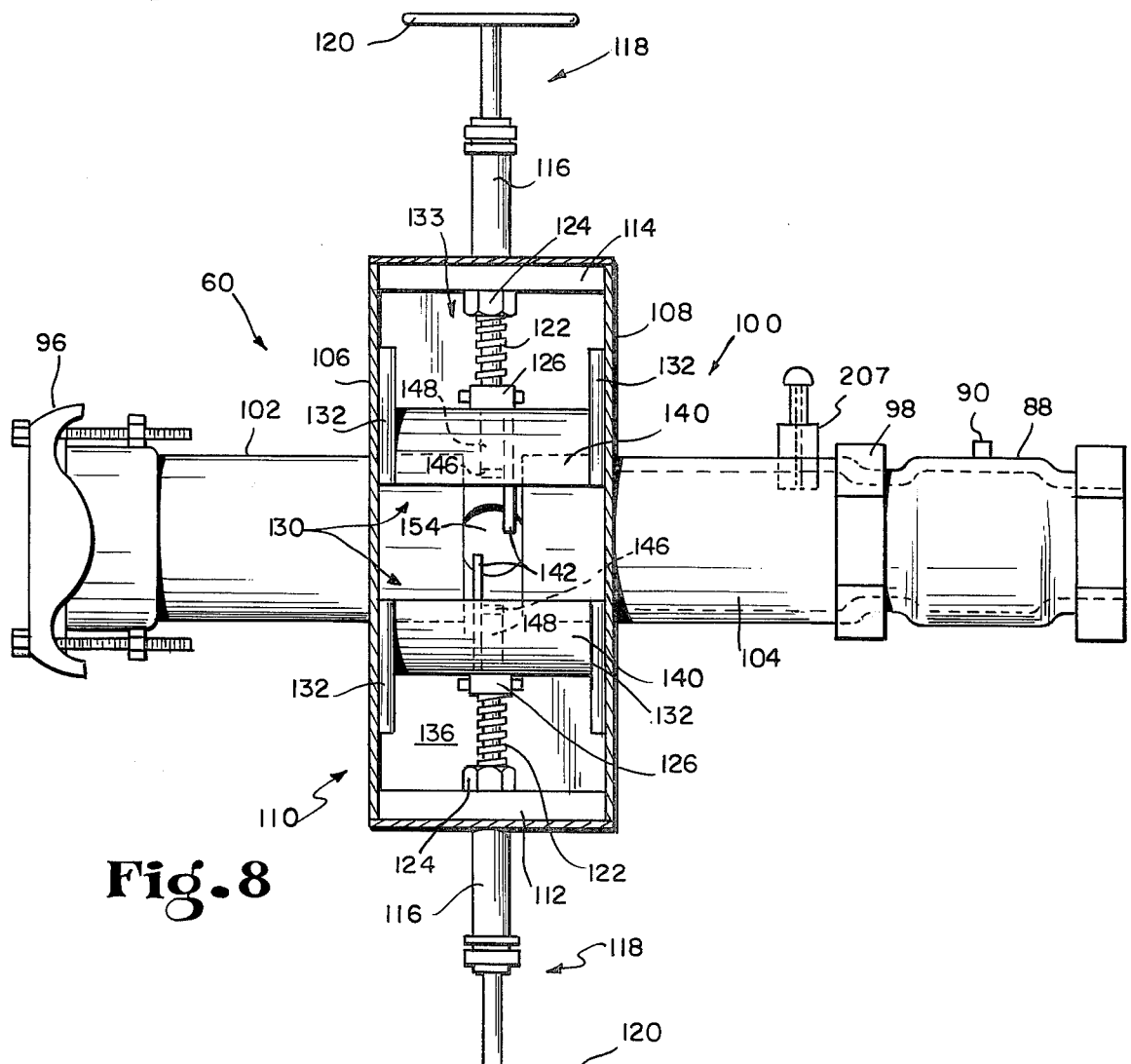

LIVE GAS MAIN INSERTIONS

This invention deals with apparatus for inserting equipment and materials, particularly a smaller diameter, higher pressure gas main, into a larger diameter, relatively lower pressure gas main while the larger diameter gas main remains in service under pressure. Importantly, the entire insertion process is carried out while the customers are connected to and serviced by the larger diameter main. Subsequently, after the insertion process is completed, individual customers are disconnected from the large diameter main and quickly transferred to the smaller diameter main.

Various methods for inserting a smaller diameter, higher pressure gas main of a corrosion resistant material, such as polyethylene or other such plastic materials, into a larger diameter, lower pressure gas main made of a material which can be corroded, such as cast iron or steel, while the larger diameter gas main remains in service under pressure, i.e., "live", are well known. See, for example, U.S. Pat. No. 3,845,789 issued Nov. 5, 1974 to Carl H. Rohrer, and titled Sub-Surface Gas Main Replacement Method, U.S. Pat. No. 3,688,801 issued Sept. 5, 1972 also to Carl H. Rohrer and titled Method For Replacing Gas Mains and U.S. Pat. No. 3,294,121 issued Dec. 27, 1966 to J. S. Powell et al and titled Method And Apparatus For Inserting A Tube Into A Pipe.

Although many such prior art patents outline methods for inserting new smaller diameter, higher pressure, corrosion resistant gas pipe within existing larger diameter, corroded gas pipe, considerable development is required to obtain suitable apparatus to implement these various methods of live main insertion.

It is, of course, desirable to conduct such live main insertions since the supply of gas to customers frequently cannot be conveniently interrupted to replace existing gas mains with newer non-corrosive mains. For example, when gas is required by customers to heat their homes, it is undesirable to interrupt gas service for any appreciable length of time. Thus, gas main replacement may be limited to particular times of the year when gas service needs are minimal. However, this results in substantial needs of crews and equipment to replace mains during those particular times of the year, and relatively little need for equipment or crews to replace mains at other times of the year.

Further, and importantly, without suitable equipment to seal a live gas main into which another main is being inserted, it is necessary to complete the insertion job in a particular section of live gas main with considerable dispatch in one uninterrupted work interval. It is an object of the present invention to provide such suitable equipment and a method for using same.

Accordingly, it is an object of the present invention to provide apparatus for inserting a smaller diameter gas main into an existing larger diameter gas main without interrupting service from the larger diameter main, while the larger diameter main remains in a sealed condition.

It is a further object of the present invention to provide apparatus for sealing the two ends of a section of existing gas main while that section of gas main remains under pressure so that the insertion process into that particular section of gas main may be halted for one or more extended time intervals to allow testing to be conducted on the inserted main, and otherwise to allow the insertion process to last longer than one work interval, e.g., one day, without resulting in substantial leakage of gas from the live outer main.

An additional object of the present invention is to provide a fitting for insertion of an elongated member axially into the end of a live gas main section. The fitting includes a housing defining a passageway opening which extends longitudinally through the housing. At opposite ends of the housing are interior and exterior openings. Means are provided for mounting the housing on the main end with the interior opening in sealing engagement and coaxial registry with the main end. The housing further includes a channel extending generally transversely thereof between the interior and exterior openings. Selectively movable closure means are disposed in the channel for increasing and decreasing the size of the passageway opening. The closure means include means for defining an aperture which extends axially of the fitting and means for providing a perimetral seal for the aperture. The aperture has a cross section substantially equal to the cross section of the elongated member. The aperture defining means and perimetral seal means sealingly close the main end when the elongated member is inserted through the exterior and interior openings and into the main end and the closure members are closed about it.

Other and further objects of the invention will become apparent to those skilled in the art to which this invention pertains as this disclosure progresses.

The invention may best be understood by referring to the following description and accompanying drawings of which:

FIG. 5 is a schematic diagram of the section of live gas main in a still further phase of replacement procedure;

FIG. 6 is a schematic diagram of the live gas main section in a subsequent phase of the replacement procedure;

FIG. 7 is a schematic diagram of the live gas main section with the replacement procedure completed;

FIG. 8 is a fragmentary side elevational view of a portion of the apparatus used in the live gas main insertion procedure illustrated in FIGS. 1-7;

FIG. 9 is a top plan view of the apparatus of FIG. 8;

FIG. 12 is a detail of the insertion apparatus illustrated in FIGS. 1-7.

Figure 1:
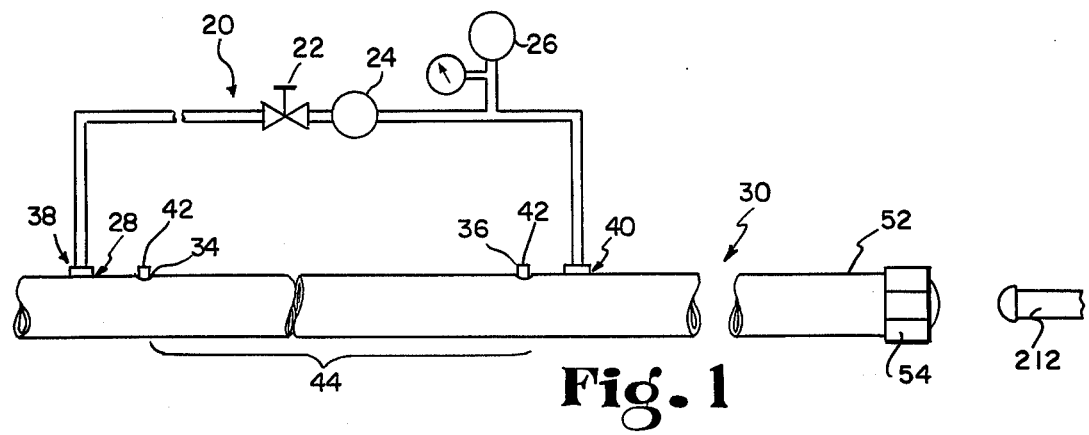
FIG. 1 is a schematic diagram of a section of live gas main undergoing replacement.

Referring now to the initial phase of the live main insertion procedure illustrated in FIG. 1, a by-pass 20 complete with a manually operable shut-off valve 22, a check valve 24 and a recording pressure guage 26 is installed between a low pressure gas source main 28 and a section 30 of low pressure gas main into which a new, relatively smaller diameter, higher pressure main section is to be inserted. By-pass 20 is of sufficient capacity to provide full low pressure gas supply to customer's connections (not shown) to main section 30. The section 30 may be, for instance, one block long, and it will be appreciated that many customers may be connected to and serviced by such a main section.

Using conventional techniques and equipment, tapped entries 34, 36 are drilled into the side walls of the gas main intermediate the entries 38, 40, respectively, of by-pass 20 into main sections 28, 30, respectively. Inflatable sealing bags 42 are inserted into taps 34, 36 and inflated, sealing main section 44 therebetween and preventing the flow of low pressure gas through main section 44. Inflatable bag seals 42 are illustrated diagrammatically in FIGS. 2–3.

Figure 2:
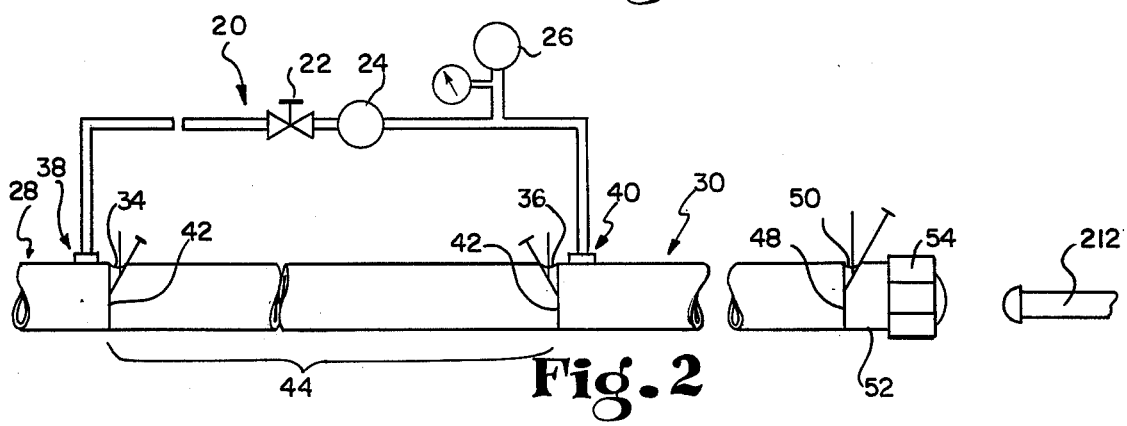
FIG. 2 is a schematic diagram of the section of gas main in a later phase of the replacement procedure.
Figure 3:
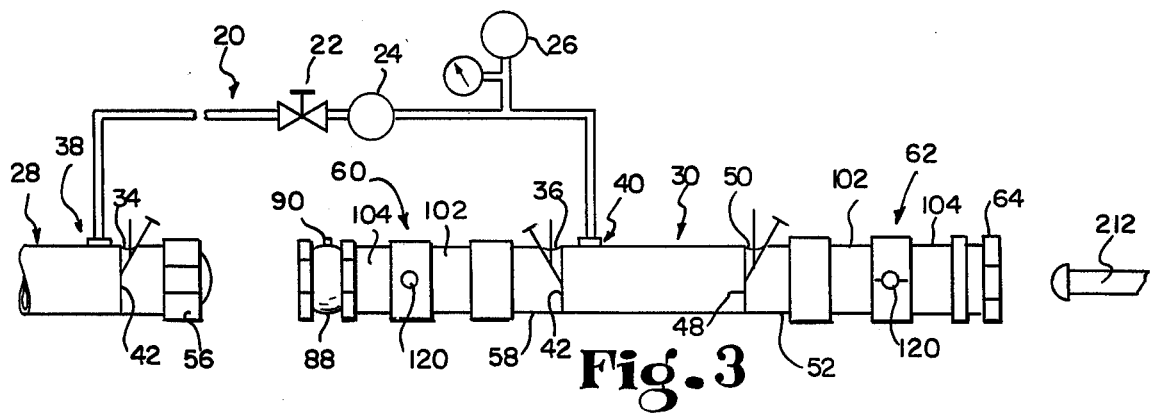
FIG. 3 is a schematic diagram of the section of live gas main in a still later phase of the replacement procedure.

All gas supplied to main section 30 will thus be supplied through by-pass 20. As illustrated in FIG. 2, an additional bag seal 48 is placed into a tapped hole 50 in the side wall of main section 30 near its terminal end 52 which is closed by a closure cap 54. Bag seal 48 is then inflated, sealing main section 30. Main section 30 thus being sealed by bag seals 48, 42, closure cap 54 may be removed.

Main section 44 is then cut intermediate bag seals 42 and a closure cap 56 is placed on the end of source main 28 to close it. An insertion fitting 60 and a terminal fitting 62 are then installed on ends 58, 52, respectively, of section 30. Details of fittings 60, 62 will be explained as this specification progresses. Each of insertion and terminal fittings 60, 62 is securely anchored to main section 30 and is sealed thereto for later insertion steps. The terminal fitting 62 is then terminated by a compression fitting 64 having an inside diameter equal to the outside diameter of the new main section to be inserted. A clear plastic tube 66 (FIG. 4) having a closed outer end 68 and an outside diameter equal to the inside diameter of fitting 64 is inserted into the outer end thereof and compression fitting 64 is tightened, sealing end 52.

The insertion fitting 60 on end 58 is terminated by a nipple fitting 70, which includes a dome-shaped nipple 72 having a small diameter central circular aperture 74 situated therein, an outer grease chamber 76 having a grease fitting 78, a seal 80 having a central circular aperture of the same diameter as nipple 70 and registering therewith, an inner grease chamber 82 having a grease fitting 84 and a pipe section 88 having an inside diameter equal to the outside diameter of the main section to be inserted and at least one grease fitting 90 thereon.

Figure 4:
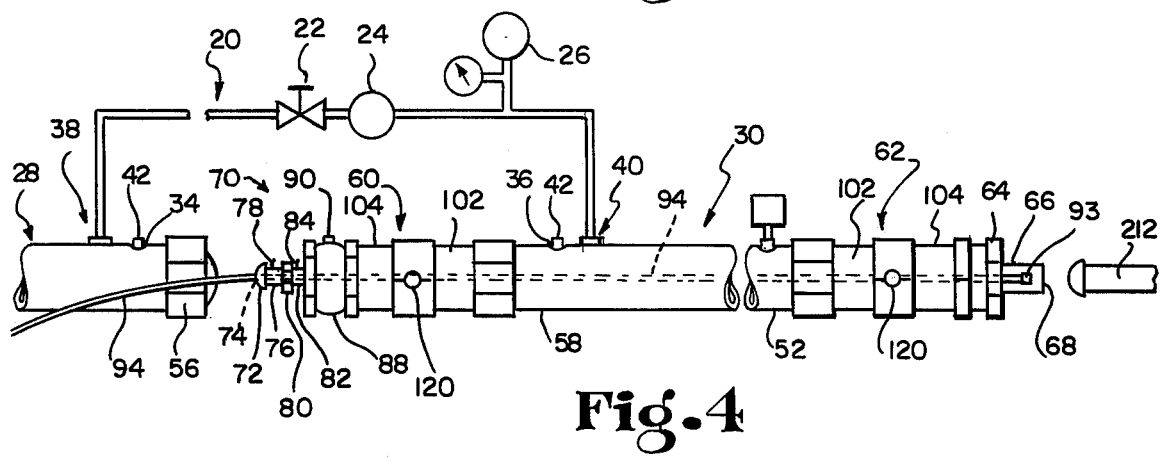
FIG. 4 is a schematic diagram of the section of live gas main in a further phase of replacement.

As illustrated in FIG. 4, a semirigid rod 94 having a diameter equal to the diameter of the central orifice 74 in nipple 72 is inserted into nipple 72, thereby sealing central orifice 74. At this time, bag seals 42, 48 are deflated. Rod 94 has an attachment head 93 at the leading end thereof. Chambers 76, 82 are then filled with an inert grease, e.g., flax soap, through fittings 78, 84. In this and succeeding operations the grease lubricates and seals the various parts to be explained. Rod 94 is then pushed through sections 76, 82, 88 and into insertion fitting 60.

Figure 10:
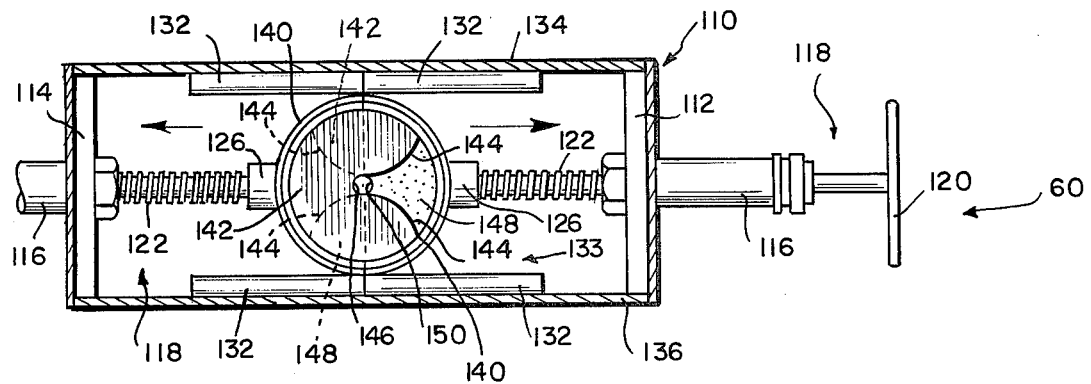
FIG. 10 is a fragmentary sectional view of the apparatus of FIGS. 8-9 taken along section lines 10—10 of FIG. 9.

Referring now to FIGS. 8–10, insertion fitting 60 is shown to illustrate the structure of fittings 60, 62. Each of insertion and terminal fittings 60, 62 comprises a fitting 96 at one end thereof, for attaching the fittings 60, 62 to main ends 52, 58, respectively. At the remaining end of each of fittings 60, 62 is a fitting 98 with a central circular aperture having a diameter equal to the outside diameter of the main section to be inserted. Fittings 98 slidingly and sealingly receive this inserted main section in a manner to be described in greater detail hereinafter. Fitting 98 is adapted for attaching one of fittings 64, 88 to fittings 60, 62, respectively. Each fitting 60, 62 further comprises a housing 100 including cylindrical sections 102, 104 coupled between fittings 96, 98, respectively, and two axially spaced apart opposed side walls 106, 108, respectively, of an elongated box-shaped center section 110. Center section 110 is closed at two diametrically opposite ends by a pair of sealing end walls 112, 114 which are desirably bolted or otherwise attached to center section 110 for removal therefrom. Protruding from each of walls 112, 114 is a cylindrical member 116 which houses a bolt 118. Each of bolts 118 has a handle 120 attached to its outer end and is threaded for a portion 122 of its length.

Attached on the interior sides of walls 112, 114 are a pair of nuts 124 which threadedly receive portions 122 of bolts 118.

Figure 11:
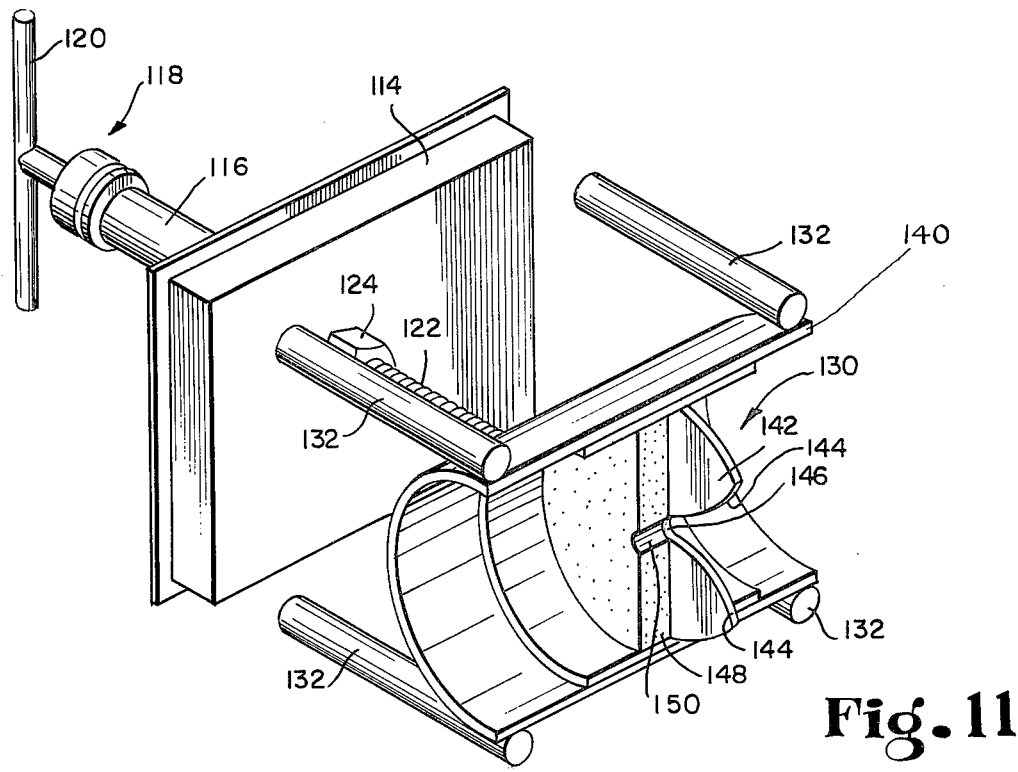
FIG. 11 is a perspective view of certain details of the apparatus of FIGS. 8-10.

As clearly shown in FIG. 11, a closure member 130 is attached to the interior end 126 of each of bolts 118. Each closure member 130 includes four guide members 132 at its four corners, one of guide members 132 fitting into each of the corners formed by walls 106, 108 and the connecting walls 134, 136 of center section 110. Members 132 guide closure members 130 back and forth within the channel 133 formed by walls 106, 108, 134, 136 as bolts 118 are turned by handles 120.

Each closure member 130 further includes a half section 140 of a cylindrical shell. The guide members 132 are welded or otherwise fastened to the shell sections 140. Also welded or otherwise attached to the interior wall of each section 140 and extending perpendicularly thereto is a disk-shaped gate member 142. Each of gate members 142 includes a pair of curved edges 144 running generally from the center thereof outwardly to the periphery thereof. Each of members 142 further includes a semi-circularly shaped central cutout 146 having a radius of curvature equal to one-half the diameter of the semirigid rod 94.

Also extending outwardly perpendicularly from the interior side wall of each of shell sections 140 adjacent member 142 is a gasket 148 having a centrally located semicircular cutout 150 in registry with the cutout 146 in its associated member 142. Cutout 150 is slightly smaller than cutout 146 to insure that gasket 148 seals about rod 94 when gate members 142 are closed thereabout. Gaskets 148 are desirably made of soft rubber or rubberlike material, while gate members 142 may be metal or some other rigid material.

The members 142 in the two facing cylindrical half sections 140 are axially offset or staggered from one another by a distance equal to the thickness of gaskets 148. Thus, when bolts 118 are rotated to their inner extents, thereby placing closure members 130 in abutting relationship at the center of channel 133, as illustrated in FIG. 10, there is defined at the center of the channel a cylindrical aperture which is concentric with the inside diameters of portions 102, 104 of insertion and terminal fittings 60, 62 and has the same diameter as rod 94.

There is also defined in wall 136 a viewing port 154 covered and sealed by a transparent material, e.g., glass, so that the opening and closing of gate members 142 can be observed.

After semirigid rod 94 has passed into the vicinity of gate portions 142 of the insertion fitting 60 on end 58, bolts 118 are turned to separate gate members 142 of both of fittings 60, 62. Rod 94 is inserted the full length of main section 30 until its attachment head 93 is visible in tube 66 at end 52 as illustrated in FIG. 4. The completion of this phase of the insertion operation is illustrated in FIG. 4.

Gate members 142 of terminal fitting 62 at end 52 are then closed upon one another, sealing rod 94 in the aperture formed between cutouts 146, 150 and preventing the escape of gas from main section 30. Curved edges 144 urge rod 94 into the central aperture insuring that rod 94 will be properly centered for sealing main section 30. Compression fitting 64 is then loosened and tube 66 is removed. A plastic covered cable 160 having a circular cross section and a diameter substantially equal to the diameter of rod 94 is threaded into a nipple assembly 162 (FIG. 5) comprising a nipple 164 having a central circular aperture 166 with a diameter equal to the cable 160 diameter, an outer grease chamber 168 having a grease fitting 170, a seal 172 and an inner grease chamber 174 having a grease fitting 176. Cable 160 is then attached to the attachment head 93 of rod 94 and inner grease chamber 174 is secured in compression fitting 64, thereby sealing end 52 of main section 30 again.

Cable 160 is rigged through a pulley assembly 180 to a winch (not shown), and chambers 168, 174 are filled with an inert grease. Gate members 142 of terminal fitting 62 are then opened.

Rod 94 is pulled back through main section 30, pulling with it cable 160. An indicating mark on rod 94 near attachment head 93 thereof indicates the proximity of cable 160 as rod 94 is pulled outwardly through nipple 72. As soon as this mark appears, insertion fitting 60 on end 58 is closed upon cable 160, thereby sealing end 58. Nipple assembly 70 is then removed from the end of pipe section 88 and the end of cable 160 extending outwardly from the end of pipe section 88 is attached to the flexible inner main section 182 (FIG. 6) which is to be inserted into the old main section 30. Main section 182 is attached to cable 160 by a "bull nose" assembly 184, illustrated in more detail in FIG. 12.

In the assembly of FIG. 12, cable 160 is coupled to the bull nose assembly 184 by an attachment head 186 similar to attachment head 93 of rod 94. A rod 188, which is threaded for part of its length, runs from the attachment head 186 through a longitudinally extending hole centrally located in the bull nose 190. Bull nose 190 includes a dome-shaped outer or forward portion 192 and a rearwardly extending cylindrical tail portion 194 having an outer diameter equal to the inside diameter of replacement main section 182. Bull nose 190 is secured on rod 188 between two nuts 196, 198. Bull nose 190 is attached to replacement main section 182 by a plurality of transversely extending set screws 200, the heads of which are flush with the outer surface of replacement main section 182. Attachment of the bull nose assembly 184 to replacement main section 182 seals the end of main section 182. Importantly, a tracer wire 204 is then securely attached to cable 160 forward of bull nose assembly 184 from a spool 206 mounted on insertion fitting 60. Tracer wire 204 is fed into insertion fitting 60 through a tracer wire insertion fitting 207 extending through the wall of cylindrical section 104. Tracer wire insertion fitting 207 allows the tracer wire 204 to be fed into the insertion fitting without disrupting the seal of main section 30.

Pipe section 88 is filled with grease through grease fitting 90 by, e.g., a grease gun 202, as illustrated in FIG. 6. The flexibility of cable 160 allows the bull nose 190 to be inserted into the central aperture of pipe section 88. The central aperture of pipe section 88 being of the same diameter as inner main section 182, pipe section 88 is sealed by insertion of the bull nose into it. Gates 142 of insertion and terminal fittings 60, 62 are opened sufficiently to allow replacement main 182 to pass through the end closures and the winch is started, drawing cable 160, replacement main 182 and tracer wire 204 through pipe section 88, through insertion fitting 60, main section 30, and terminal fitting 62 where the presence of tracer wire 204 or a mark on cable 160 outside of nipple 164 indicates the proximity of the replacement main section 182. It may be desirable to turn main section 182 as it is being inserted to wrap tracer wire 204 about section 182. The completely inserted replacement main section 182 now forms part of the sealed enclosure for gas supplied to the annular space between the interior walls of main section 30 and the exterior walls of main section 182. Since main section 30 is now sealed, work on it may be halted temporarily, e.g., to test section 182, without danger of gas leakage.

Bag seals 42, 48 are then reinflated effectively to seal main section 30 about the now completely inserted replacement main section 182. Nipple assembly 162 may then be removed and cable 160 may be detached from bull nose 184. Pipe section 88 is then removed, as is compression fitting 64. Insertion and terminal fittings 60, 62 may then be removed and replaced by conventional split end seals 210, thereby sealing main section 30 so that bag seals 42, 48 may be deflated, removed from tapped holes 36, 50 and replaced by tap plugs (not shown). Replacement main section 182 is then connected to a smaller diameter high pressure main supply 212 and capped as illustrated at 214 in FIG. 7. The tracer wire 204 is then anchored to replacement main section 182 and is connected as at 216 to form the required "sacrificial anode" for the new high pressure main installation. Individual customers may then be sequentially connected into the new high pressure main as illustrated at 220 either immediately or at some later date. The section 30 of low pressure main, of course, will remain in service until such time as the new high pressure main becomes serviceable.

There is thus disclosed apparatus for inserting into a live low pressure gas main section a smaller diameter tubing section which may be later connected to a higher pressure gas source to form a section of a higher pressure gas main for replacing the lower pressure main.

Importantly, the insertion and terminal fittings 60, 62 include cooperating gates 142 having surfaces 144 which serve to center the semirigid rod 94 and flexible cable 160. The centering function aids in achieving an excellent seal of the low pressure main section 30 during the various phases of the insertion procedure by locating rod 94 and cable 160 between sealing surfaces 150. The use of rod 94 and cable 160 to aid in sealing the low pressure main section 30, of course, aids in the insertion procedure, since sealing of main section 30 at the end of each phase of insertion allows activity to be halted safely at several convenient times during the insertion procedure for extended periods of time.

The apparatus of the present invention makes such insertions extremely simple and economical. For example, one live gas main insertion using the apparatus of the present invention costs the installer $3736, compared with the projected cost of $9680 for a conventional excavation-type cast iron main placement. The savings resulting from the use of the apparatus of the present invention were thus $5944. In another installation utilizing the insertion apparatus of the present invention, the installation cost was $596, compared to a projected cost for a conventional excavation-type installation of $1262, a savings of $666. Finally, an installation that, using the insertion apparatus of the present invention, costs $1100 would have cost $3277 using conventional installation techniques. The savings resulting from the use of the apparatus of the present invention were thus $2177.

Although the method and apparatus herein disclosed are not limited in application to any range of gas pressures, they are particularly useful with gas pressures in excess of 5 pounds per square inch.

What is claimed is:

1. A fitting for insertion of an elongated member longitudinally into an end of a live section of gas main, said fitting comprising a housing providing a passageway opening extending axially therethrough and providing an exterior opening and an interior opening, means for coaxially mounting said housing on said main end with said interior opening in sealing engagement and in coaxial registry with said main end, in which the improvement comprises means on said housing providing a channel extending generally transaxially of said fitting between said exterior opening and said interior opening, and first and second closure members slidably received in said channel and adjustably movable toward one another to decrease the size of said passageway opening and away from one another to increase the size of said passageway opening, said first and second closure members each including a gate member and a resilient gasket member adjacent said gate member, said gate members on said first and second closure members being axially offset from one another, said gate members cooperatively closing with said gasket members therebetween, said gate members and gasket members cooperatively defining an aperture having a cross section substantially equal to the cross section of the elongated member, said elongated member being insertable into said passageway and said closure members being movable toward one another sealingly to close said passageway about said elongated member.

2. A fitting according to claim 1 wherein said gate members on said first and second closure members are axially offset from one another by a distance substantially equal to the thickness of said gasket members, said gate members cooperatively closing with said gasket members therebetween, said gate members and gaskets cooperatively defining said aperture, said gate members including means for guiding said elongated member into said aperture, and said gasket members moving into abutting relationship to seal said passageway opening about said elongated member extending through said aperture.

3. The improvement of claim 2 in which said fitting further comprises a nipple having a centrally disposed orifice extending longitudinally therethrough, means for sealingly mounting said nipple of said housing exterior opening, said nipple orifice having the same cross section as said elongated member, the nipple orifice slidingly and sealingly receiving said elongated member, and means for defining a grease fitting for introducing a lubricating and sealing grease into said fitting to aid in inserting said elongated member therethrough.

4. For performing live gas main insertions, apparatus for inserting an elongated member the full length of a gas main section, said elongated member having a first cross section and said main section having first and second opposite ends, said main section being under pressure from a source of pressure and said pressure source being connected to said main section intermediate said ends, said apparatus comprising first and second fitting means for closing said first and second main ends, respectively, said first and second fitting means being coupled to said first and second ends, respectively, said first fitting means including means defining an insertion orifice having a cross section equal to said first cross section, the insertion orifice being sized slidingly and sealingly to receive said elongated member, each of said first and second end fitting means having an interior end attached to the main section and an opposite exterior end with a passageway extending axially therebetween and including means defining a transaxially extending channel disposed between said interior and exterior ends, selectively movable means for increasing and decreasing the size of the passageway, said selectively movable means being disposed in said channel, said selectively movable means including means for defining an orifice having a cross section substantially equal to said first cross section sealingly to engage said elongated member as said elongated member is inserted through said first and second fitting means and said selectively movable means are closed upon it, a tube for insertion into said main section, said tube having a circular cross section larger than said first cross section and smaller than the cross section of said main section, said selectively movable means being movable to increase the size of the passageway sufficiently so that said tube may be inserted the full length of said main section, said insertion orifice defining means being removable from said first end fitting during insertion of said tube into said main section, said apparatus further including an entry seal having an aperture registrable axially of said passageway, said entry seal sized to replace said insertion orifice defining means, said entry seal aperture having a diameter substantially equal to the diameter of said tube slidingly to receive said tube therein, said entry seal providing a grease fitting for insertion of a sealing and lubricating grease into said entry seal to aid in sealing said aperture and in inserting said tube the full length of said main section.

5. Apparatus for use in inserting a relatively smaller diameter tube into a length of relatively larger diameter live gas main by inserting a stiff rod having a cross section smaller than the tube into a first end of the length of live main, pushing the rod through the length of live main to the second end thereof, attaching a flexible cable of substantially the same cross section as the rod to the end of the rod at the second end of the length of live main and pulling the rod and cable back through the length of live main toward the first end thereof, attaching one end of the tube to the end of the cable at the first end of the length of live main and pulling the cable and tube toward the second end of the length of live main, the apparatus including a removable entry fitting defining a rod-insertion orifice sized to receive the rod slidingly and sealingly, an entry housing for defining a passageway extending axially between the rod-insertion orifice and the first end of the length of live main, the entry housing being attachable to the first end of the length of live main, the entry housing removably retaining the entry fitting, the entry housing further defining a pair of axially opening cylinders, first and second selectively movable gate means for decreasing the passageway opening between the rod-insertion orifice and the first end, the first and second gate means being mounted in the axially opening cylinders and movable together cooperatively to define a minimum passageway opening, the minimum passageway opening sized to receive the rod and seal the first end of the length of live main, the minimum passageway opening having a cross section equal to the cross section of the rod, the first and second gate means further including means for moving the rod into the minimum passageway opening as the first and second gate means are moved together to seal about the rod, a removable closure member sized to receive the rod, a terminal housing for defining a passageway extending axially from the second end of the length of live main to the removable closure member, the terminal housing being attachable to the second end of the length of live main and removably retaining the closure member, the terminal housing further defining a pair of axially opening cylinders, third and fourth selectively movable gate means for decreasing the passageway opening between the second end and the closure member, the third and fourth gate means being mounted in the axially opening cylinders and movable together cooperatively to define a minimum passageway opening to receive the rod and seal the second end of the length of live main, the minimum passageway opening having a cross section equal to the cross section of the rod, the third and fourth gate means further including means for moving the rod into the minimum passageway opening defined thereby as the third and fourth gate means are moved together to seal about the rod, the moving means comprising a pair of cooperating centering edges on each of the first, second, third and fourth gate means.

6. Apparatus for use in inserting a relatively smaller diameter tube into a length of relatively larger diameter live gas main by inserting a stiff rod having a cross section smaller than the tube into a first end of the length of live main, pushing the rod through the length of live main to the second end thereof, attaching a flexible cable of substantially the same cross section as the rod to the end of the rod at the second end of the length of live main and pulling the rod and cable back through the length of live main toward the first end thereof, attaching one end of the tube to the end of the cable at the first end of the length of live main and pulling the cable and tube toward the second end of the length of live main, the improvement in which the apparatus includes a removable entry fitting defining a rod-insertion orifice sized to receive the rod slidingly and sealingly, an entry housing for defining a passageway extending axially between the rod-insertion orifice and the first end of the length of live main, the entry housing being attachable to the first end of the length of live main, the entry housing removably retaining the entry fitting, the entry housing further defining a pair of axially opening cylinders, first and second selectively movable gate means for decreasing the passageway opening between the rod-insertion orifice and the first end, the first and second gate means being mounted in the axially opening cylinders and movable together cooperatively to define a minimum passageway opening, the minimum passageway opening sized to receive the rod and seal the first end of the length of live main, the minimum passageway opening having a cross section equal to the cross section of the rod, the first and second gate means further including means for properly positioning the rod therebetween, a removable closure member sized to receive the rod, a terminal housing for defining a passageway extending axially from the second end of the length of live main to the removable closure member, the terminal housing being attachable to the second end of the length of live main and removably retaining the closure member, the terminal housing further defining a pair of axially opening cylinders, third and fourth selectively movable gate means for decreasing the passageway opening between the second end and the closure member, the third and fourth gate means being mounted in the axially opening cylinders and movable together cooperatively to define a minimum passageway opening to receive the rod and seal the second end of the length of live main, the minimum passageway opening having a cross section equal to the cross section of the rod, the third and fourth gate means further including means for properly positioning the rod therebetween, the first and second gate means including first and second gate members respectively, the first and second gate members being axially offset from one another, and further comprising gasket means for contacting one another and the rod to seal the entry housing passageway about the rod, the gasket means disposed adjacent each of the first and second gate members and movable therewith.

7. Apparatus according to claim 6 wherein the third and fourth gate means include third and fourth gate members respectively, the third and fourth gate members being axially offset from one another, and further comprising gasket means for contacting one another and the rod to seal the terminal housing passageway about the rod, the gasket means disposed adjacent each of the third and fourth gate members and movable therewith.

8. Apparatus according to claim 7 where the gasket means on the first and second gate members are disposed axially between the first and second gate members and the gasket means on the third and fourth gate members are disposed axially between the third and fourth gate members.

* * * * *